(12) United States Patent
Kerr

(10) Patent No.: US 11,657,463 B2
(45) Date of Patent: May 23, 2023

(54) SYSTEM AND METHOD FOR CUSTOMIZABLE LINK BETWEEN TWO ENTITIES

(71) Applicant: Arthur Ray Kerr, Madeira Beach, FL (US)

(72) Inventor: Arthur Ray Kerr, Madeira Beach, FL (US)

( * ) Notice: Subject to any disclaimer, the term of this patent is extended or adjusted under 35 U.S.C. 154(b) by 182 days.

(21) Appl. No.: 17/330,408

(22) Filed: May 26, 2021

(65) Prior Publication Data

US 2021/0279820 A1 Sep. 9, 2021

Related U.S. Application Data

(63) Continuation of application No. 16/999,125, filed on Aug. 21, 2020, now Pat. No. 11,062,403.

(Continued)

(51) Int. Cl.
| | |
|---|---|
| *G06Q 50/00* | (2012.01) |
| *G06F 16/23* | (2019.01) |
| *H04L 9/32* | (2006.01) |
| *G06Q 30/018* | (2023.01) |
| *H04L 67/06* | (2022.01) |
| *H04L 61/3015* | (2022.01) |
| *G06Q 30/0251* | (2023.01) |
| *H04L 61/45* | (2022.01) |
| *H04L 61/4552* | (2022.01) |

(52) U.S. Cl.
CPC ......... *G06Q 50/01* (2013.01); *G06F 16/2379* (2019.01); *G06Q 30/0185* (2013.01); *G06Q 30/0269* (2013.01); *H04L 9/3226* (2013.01); *H04L 61/3015* (2013.01); *H04L 61/4547* (2022.05); *H04L 61/4552* (2022.05); *H04L 67/06* (2013.01)

(58) Field of Classification Search
CPC ............... H04L 9/3226; H04L 61/4552; H04L 61/3015; H04L 61/4547; H04L 67/06; H04L 67/565; H04L 63/08; G06F 16/2379; G06Q 30/0185; G06Q 30/0269; G06Q 50/01
See application file for complete search history.

(56) References Cited

U.S. PATENT DOCUMENTS

| | | | |
|---|---|---|---|
| 7,155,739 B2 | 12/2006 | Bari et al. | |
| 7,356,497 B1 * | 4/2008 | Bursey | G06Q 40/00 705/37 |

(Continued)

FOREIGN PATENT DOCUMENTS

WO 2017163069 A1 9/2017

OTHER PUBLICATIONS

Kylook, Kylook.com: http://www.kylook.com/en [date accessed Apr. 25, 2019].

*Primary Examiner* — Etienne P Leroux
(74) *Attorney, Agent, or Firm* — Christopher Mayle; Bold IP, PLLC

(57) ABSTRACT

A system and method having an improved communication system and method to permanently create and maintain private connections between entities such as two people, businesses, and/or other types of organizations and entities whereby to create an account with the example communication system, a user may complete an online personal contact application, such that once the information is verified, the user may be assigned a Unique Identification.

9 Claims, 9 Drawing Sheets

Related U.S. Application Data

(60) Provisional application No. 62/904,157, filed on Sep. 23, 2019.

(56) References Cited

U.S. PATENT DOCUMENTS

| | | | | |
|---|---|---|---|---|
| 7,849,115 | B2* | 12/2010 | Reiner | G06Q 30/02 |
| | | | | 707/912 |
| 9,239,717 | B1* | 1/2016 | AlSaeed | G06F 8/65 |
| 9,795,539 | B2* | 10/2017 | Grützmacher | A61J 7/0481 |
| 9,959,505 | B1* | 5/2018 | Milakovich | G06N 7/01 |
| 10,984,059 | B2* | 4/2021 | Huang | G06Q 30/0201 |
| 11,010,270 | B2* | 5/2021 | Dankberg | G06F 11/2023 |
| 2009/0271321 | A1 | 10/2009 | Stafford | |
| 2010/0274646 | A1* | 10/2010 | Townsend | G06Q 30/0277 |
| | | | | 705/14.66 |
| 2010/0325245 | A1* | 12/2010 | Sibillo | G06F 16/9535 |
| | | | | 709/219 |
| 2011/0018998 | A1* | 1/2011 | Guzik | H04N 21/21 |
| | | | | 348/143 |
| 2011/0305330 | A1* | 12/2011 | Skoczkowski | H04W 4/24 |
| | | | | 379/201.03 |
| 2014/0281861 | A1* | 9/2014 | Schachter | G06F 16/93 |
| | | | | 715/205 |
| 2015/0161349 | A1* | 6/2015 | Rodriguez | G16H 10/60 |
| | | | | 705/3 |
| 2017/0359301 | A1* | 12/2017 | Shah | H04L 61/4594 |
| 2018/0276698 | A1* | 9/2018 | Bryant, III | G06Q 30/0214 |
| 2019/0066063 | A1 | 2/2019 | Jessamine | |
| 2019/0303605 | A1* | 10/2019 | Okabe | G06F 40/126 |
| 2021/0056147 | A1* | 2/2021 | Pesochinsky | H04L 67/306 |

* cited by examiner

SYSTEM AND METHOD FOR CUSTOMIZABLE LINK BETWEEN TWO ENTITIES

CROSS-REFERENCE TO RELATED APPLICATIONS

This application is a continuation of U.S. Non-Provisional patent application Ser. No. 16/999,125 filed on Aug. 21, 2020, which claims priority to U.S. Provisional Patent Application No. 62/904,157 filed on Sep. 23, 2019, which are incorporated by reference in their entirety.

FIELD OF THE DISCLOSURE

This disclosure relates to the field of communication transmission systems and methods, and more particularly creating, managing, controlling, and customizing data transmission between parties.

BACKGROUND

In today's world, people use a wide array of devices to communicate with each other, such as cell phones, email, and other messaging services for sending and receiving messages and data. These programs and apparatus assist in keeping track and managing all of the communications that people receive as well as storing information about various contacts. However, an issue is that, depending on the relationship between two parties, it may be better to have a different way of storing one's contact information and sending communications between each party. For example, a contact from work or a relationship formed with someone via LINKEDIN may not be the same as one made on FACEBOOK or an old friend from high school. Each could be stored within proprietary software or within a contact list on a cell phone, a home computer, a personal cell phone or a phone that belongs to your employer. As people make their way through life and meet new people or become reacquainted with old friends, it has become a problem to keep their contact information in one place and up to date. Additionally, people frequently move from their respective apartments or homes. A recent article published by NAHB (National Association of Home Builders) shows that, based on a long-run calculation that averages mobility tendencies over a number of years, the typical buyer of a single-family home can be expected to stay in the home approximately 13 years before moving out. When someone moves, offering the ability to pass along or make available to others their updated contact information would be helpful.

On average, it is estimated that a smartphone may last 1.8 years, a tablet may last 2.2 years, a server may last 3 years, a laptop may last 3-5 years, and a desktop computer may last 4.6 years. The ID and contact information retained within or for each of these devices (contact numbers, email address, physical addresses, social media links, and so on) are not only specific to the device, but often change over time. Many of these devices are not only used to contact others, but many also are used to store contact information. With most current devices, people have the power to manage one's own individual contacts, but not the power to share contact information that is then stored on other people's devices. As time goes by, many people can lose a lot of valuable information and contacts for others. Accordingly, as time passes, without constant upkeep of address books and contacts, people will lose contact with each other. Thus, exists a need for a solution to manage contact information and means of communication between people, businesses, and/or entities after a change in their addresses, telephone numbers, email addresses, and/or jobs/career, or the like occurs. A one stop shop for addresses, emails, and phone numbers with the ability to ask/see if the contacts information is up to date is invaluable in this day and age. Accordingly, there is still a need for a system and method that may address these and other issues.

SUMMARY

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

Embodiments in the present disclosure are directed to a communication system, including: a computing system having a non-transitory computer-readable medium including code, whereby instructions are executed by the computing system to perform associating a first user with a first unique identifier, associating a second user with a second unique identifier, generating a first communication link and second communication link, whereby the first communication link and the second communication link are stable links stored in one or more databases whereby contact information of the first user and the second user are stored on one or more databases whereby when the contact information is updated, whereby further instructions are executed by the computing system to perform: transmitting only partial contact information to the second user whereby selection criteria for presentation to the second user is elected by the first user, the first communication link and the second communication link each having one or more operative tags, the one or more operative tags including a geographic stamp, Internet Service Provider, or time stamp, whereby further instructions are executed by the computing system to perform: masking the first communication link behind a word, name, or symbol, the first communication link and the second communication link including the first unique identifier and the second unique identifier and one or more operative tags, sharing one or more data files associated with the first user or the second user between only the first user and the second user only once the first communication link and the second communication link has been generated, archiving old contact information once new contact information has been received, calculating account activity of the second user, the account activity determined by a time stamp of a last update or confirmation of contact information data by the second user, calculating if account activity of the second user has dropped below a predetermined threshold determined from a time stamp, whereby if the account activity has dropped below the predetermined threshold, a status of an account associated with the second unique identifier is updated, associating the first user with a business identifier linked to a business entity of the first user, whereby the business identifier comprises a sequence of alphanumeric characters unique to the business entity, and whereby the business identifier is permanently linked with the business entity and removably linked with the first user.

Embodiments in the present disclosure are also directed a communication system, including: a computing system having a non-transitory computer-readable medium including code, whereby instructions are executed by the computing system to perform: calculating if account activity of a user has dropped below a predetermined threshold determined from a time stamp, whereby if the account activity has dropped below a predetermined threshold, a first status indicator is updated to a second status indicator, the second status indicator displayed to an other user, associating the user with a first unique identifier, associating the other user with a second unique identifier, generating a communication link, whereby contact information of the user and the other user are stored on one or more databases, whereby the second status indicator is categorized by a different color than the first status indicator, whereby further instructions are executed by the computing system to perform: utilizing one or more algorithms to predict when the user will need to update the contact information based on past behavior, the communication link including the first unique identifier, the second unique identifier, and a number of operative tags.

Embodiments in the present disclosure are also directed to a communication system, including a computing system having a non-transitory computer-readable medium including code, whereby instructions are executed by the computing system to perform, associating a first user with a first unique identifier, associating a second user with a second unique identifier, and generating a communication link, whereby the communication link is a stable link and stored in one or more database, the communication link visible to the first user and shareable between multiple computing devices, the communication link having one or more operative tags, the one or more operative tags including a geographic stamp, Internet Service Provider, or time stamp.

BRIEF DESCRIPTION OF DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
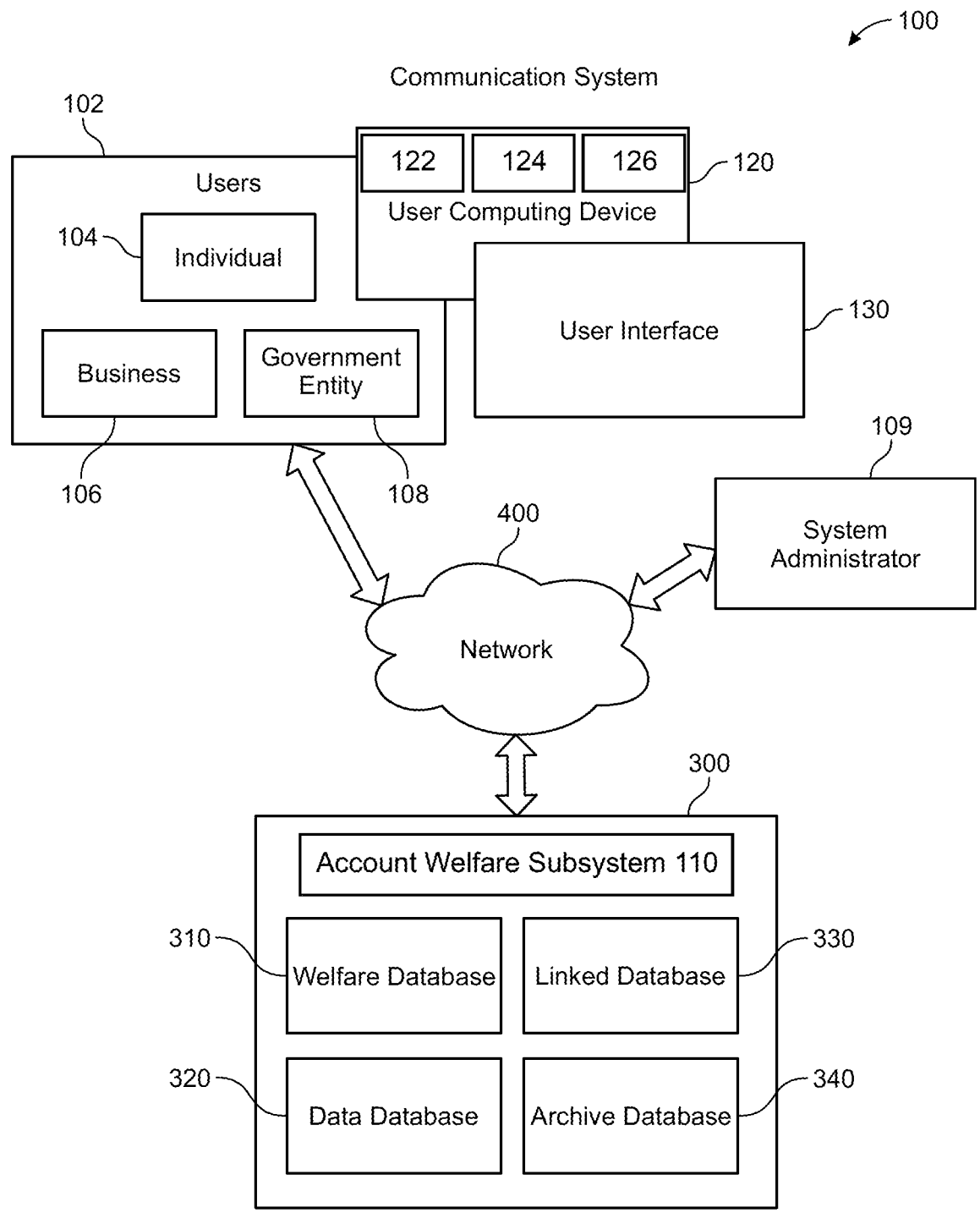
FIG. 1 shows a block diagram of a communication system for managing contacts and information.

In the Summary above and in this Detailed Description, and the claims below, and in the accompanying drawings, reference is made to particular features (including method steps) of the invention. The term "comprises," and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method including two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and the upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure recognizes the unsolved need for an improved communication system and method for a social networking contact management solution to permanently create and maintain private connections between entities such as two people, businesses, and/or other types of organizations and entities. The term "business" may be defined as a for-profit business, a non-profit business, an organization, a club, or any group of people. In one embodiment, to create an account with the example communication system, a user may complete an online personal contact application. This information is verified, and the user may be assigned a Unique Identification (UID). Each individual or entity may only hold one unique identification code at any time.

An application and approval of a replacement unique identification code will void any prior unique identification code which was previously granted. This policy may be changed to one UID per lifetime in one non-limiting embodiment, although in other embodiments, the UID may be altered and changed even for someone assigned a UID initially. Further, in one non-limiting embodiment, prior to receiving the permanent unique identification code, the individual or entity's identity may be independently verified by government and/or other sources. A user's UID contact information may be shared with a non-registered user, but the UID contact information that is shared is initially "static."

In a non-limiting embodiment, once the non-registered user creates a registered UID account, the shared UID database becomes "dynamic" and automatically updates to the most current database once contact is re-established. After registration, the user's independent software may interface with any/all User independent software based on approval to interface with the UID. User independent software may include MICROSOFT OUTLOOK, MICROSOFT OFFICE, GOOGLE, GMAIL, YAHOO, SALESFORCE, or any number of unnamed independent software programs and services that could benefit from connecting with a dynamic contact database. After registration, the user may import contacts from these and other independent software contact database systems. Further, the user would have the option to individually invite the imported contacts to register for a UID or the user could invite their entire imported database. Preregistered UID contacts would be invited to create a link.

Once a UID is assigned, the registered user may invite an unregistered user (User 2) to register for a UID and to create a permanent link with the registered user (User 1). The link (handshake) will be completed after both User 1 and User 2 have registered and agreed to be linked. This link is permanent, unless either User 1 or User 2 intentionally breaks the link. This link is unique, as both UIDs are unique. This unique link can be used for encrypted communication between the two users and can also be used to confirm that any communication is only occurring between the two parties in order to prevent spam and viruses from being sent. In one embodiment, the link is configurable. Further, any information shared between User 1 and User 2 can be restricted to only the information that each user independently agrees to share. User 1 may share more or less or different information than User 2 chooses to share.

As time passes, people often change homes, businesses, email addresses, phone numbers, and other forms of contact. People frequently lose contact with former friends, co-workers, and extended family members. Users as an individual may want to change their name due to a change of marital status or other reason. A users' identification is identified by a unique identification code and is not dependent upon name, email address, or phone number. For instance, names may be changed and updated along with other fields as managed by the user such that other connected users will not have a trouble seeking their contact information.

An advantage of the improved system and method described in the present description is that because the UID is permanent, one's contact information can be continually updated with a linked user on the communication system, thus ensuring that people and entities do not lose contact with each other over time or with moves or changes to one's devices and contact information. In one embodiment, the Permanent Link is independent of the contact information within the shared data fields. Further, the Permanent Link does not rely on any email addresses, mailing addresses, phone numbers, or other types of contact information data fields being shared or containing data.

With reference now to FIG. 1, FIG. 1 illustrates a block diagram of one exemplary embodiment of an improved communication system for permanently creating and maintaining private connections between entities such as two people, businesses, and/or other types of organizations and entities, which is referred to as communication system 100 in FIG. 1 and throughout the present description. In one or more non-limiting embodiments, communication system 100 may be innate, built into, or otherwise integrated into existing platforms or systems such as a website, a third-party program, APPLE operating systems (e.g., iOS), ANDROID, SNAPCHAT, INSTAGRAM, FACEBOOK, or any other platform. Communication system 100 may include one or more users such as user 102.

Users 102 may be individuals such as individuals 104, businesses such as businesses 106, and government entities such as government entities 108, whereby individuals 104 may have the capacity to function as an individual 104. Users 102 are responsible to keep their own, and only their own, contact information current. Users 102 cannot update the primary contact information for other users 102. That said, users 102 may have the ability to customize, edit and/or add information to the other user 102's unique linked contact information. This may be in the form of notes, alias's or inserting additional fields that are not published on the user 102 primary contact registration.

Users 102 may include any other type of individuals or entities not listed above or shown in FIG. 1 as these listed categories are non-limiting examples only. It is noted that business 106 or government entities 108 may also have the capacity to function as an individual 104. Individuals 104, businesses 106, and government entities 108 may be located in various physical locations that are either located apart or are located within physical proximity of one another.

Users 102 of communication system 100 may access a user interface such as user interface 130 using a user computing device such as user computing device 120. User interface 130 may have a plurality of buttons or icons that are selectable through user interface 130 by user 102 to instruct communication system 100 to perform particular processes in response to the selections.

Though individuals 104, businesses 106, and government entities 108 may be users 102 with the same user computing devices 120 and user interfaces 130, they may also have unique user computing devices 120 specifically tailored to the processes they wish to carry out on communication system 100. For instance, individuals 104 of communication system 100 may access user interface 130 of system 100 using an individual computing device such as individual computing device 122. While in a similar manner, businesses 106 may access user interface 130 using a business computing device such as business computing device 124 and government entity 108 may access user interface 130 using an employee computing device such as employee computing device 126.

Communication system 100 may also include one or more administrative entities such as system administrator 109. While system administrator 109 is depicted as a single element in FIG. 1 communicating over network 400, there may be multiple system administrators 109, in one or more non-limiting embodiments, that may be distributed over a network such as network 400 in any number of physical locations. System administrator 109 may manipulate the software and enter commands to server 300 using any number of input devices such as keyboard and mouse. System administrator 109 may also have responsibilities related to security, patches, updates, and overall general program maintenance. User 102 may also be their own "User Administrator" and may be responsible for Data Database 320.

User computing devices 120 may be in communication with one or more servers 300 such as server 300 via one or more networks such as network 400. Server 300 may be located at a data center or any other location suitable for providing service to network 400 whereby server 300 may be in one central location or in many different locations in multiple arrangements. Server 300 may comprise a database server such as MySQL® or Maria DB® server or any other type or brand for a database server. Server 300 may have an attached data storage system storing software applications and data. Server 300 may have a number of modules that provide various functions related to communication system 100. These modules may be in the form of software or computer programs that interact with the operating system of server 300 whereby data collected in databases as instruction-based expressions of components and/or processes under communication system 100 may be processed by one or more processors within server 300 or another component of communication system 100 as well as in conjunction with the execution of one or more other computer programs.

Communication system 100 may include one or more databases including a number of data, files, and/or folders, such as, without limitation thereto, a welfare database, such as welfare database 310, that includes data regarding a life cycle of unique identifier data including a time stamp of the last modification or confirmation. Additional databases accessible or used within communication system 100 may include a data database, such as data database 320. In one embodiment, data database 320 may include a directory of user names and their corresponding unique identifiers (UIDs), a directory of the unique identifiers, as well as any information associated with a unique identifier. Another database within communication system 100 may be linked database 330, which in one embodiment, may include all linked "handshakes" and connections between users 102 as well as a record of the level and extent of access of the data has been granted to user 102. Data Database 320 may be updated by the registered user 102. Linked Database 330 may be edited by another user 102 who has linked with user 102. Fields from Data Database 320 will overwrite edited fields in linked Database 330 when Data Database 320 is updated. Other fields or files will not be overwritten and may be used to share secure data between first user 102 and second user 102.

Further, archive database 340 may also be a type of database included within communication system 100, whereby any past information such as no longer existing or out of date contact information may be archived. Other databases may also be utilized other than those described or listed above.

Modules may be configured to receive commands or requests from user computing devices 120, server 300, and other connected devices over network 400. Server 300 may include components, subsystems, and modules to support one or more management services for communication system 100. For example, server 300 may include a module configured to allow chatting between participants and configured to maintain presence information for one or more users 102 and to provide chat functionality allowing users 102 to communicate messages in a chat through communication system 100 as well as video conferencing.

Modules may be configured to receive commands or requests from user computing devices 120 and communicate appropriate responses to requesting computing devices. Sever 300 may have a control module with appropriate firmware or software and an operating system to control overall operation and configuration of the system. The controller module may be operable communication with a network interface module, which provides interface functionality over one or more networks (wired or wireless) and possibly connectivity with other communication media.

The controller module may also be communication with an audio module and a video module, which receive and process audio and video data, respectively from user computing devices 120 for video conferencing and video chat. The audio module may include, among other modules or components for processing audio data, speech detection and recognition modules and codecs for processing incoming or outgoing video data. A speech detection module can be configured to detect instances of speech at a site (for example, to trigger recording or other functions of the communication system 100, and/or determine the relative physical location of the detected speech for use in controlling the operation of individual microphones at the site. Speech recognition may be used to distinguish between individual voices for the purpose of filtering out other voice.

The video module may include image recognition modules for use in detecting speech or distinguishing between users and appropriate codecs for use in processing incoming or outgoing video data. The image recognition modules may include face tracking or pattern recognition algorithms. The audio and video modules may also include, respectively, interfaces for data communication between input units such as microphones and cameras, and output units such as speakers and display screens. The selection and implementation of appropriate speech and video modules, including codecs and speech detection/recognition modules, image recognition modules, including appropriate encoding, decoding, and compression algorithms, are those understood by those of ordinary skill in the art. Communication system 100 may also be equipped with security modules providing end-to-end security with other systems and intermediate host systems.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including telecommunications network, a wireless network (including Wi-Fi), and a wireline network. Network 400 may include mobile telephone networks utilizing any protocol or protocols used to communicate among mobile digital computing devices (e.g., user computing device 120), such as GSM, GPRS, UMTS, AMPS, TDMA, or CDMA. In one or more non-limiting embodiments, different types of data may be transmitted via network 400 via different protocols. In alternative embodiments, user computing devices 120, may act as standalone devices and/or may operate as peer machine in a peer-to-peer (or distributed) network environment.

Network 400 may further include a system of terminals, gateways, and routers. Network 400 may employ one or more cellular access technologies including 2nd (2G), 3rd (3G), 4th (4G), 5th (5G), LTE, Global System for Mobil communication (GSM), General Packet Radio Services (GPRS), Enhanced Data GSM Environment (EDGE), and other access technologies available now or in the future that may provide for broader coverage between computing devices if for instance they are in a remote location not accessible by other networks.

User computing devices 120, may be any type of computing device that typically operates under the control of one or more operating systems which control scheduling of tasks and access to system resources. User computing devices 120 may be mobile computing devices such as a iPhone™, Android-Based™ phone, or Windows-Based™ phone, however, this is non-limiting and they may be any computing device such as a tablet, television, desktop computer, laptop computer, gaming system, wearable device electronic glasses, networked router, networked switch, networked, bridge, or any computing device capable of executing instructions with sufficient processing power and memory to perform and execute instructions and operations for communication system 100. User computing devices 120 may have location tracking capabilities such as Mobile Location Determination System (MLDS) or Global Positioning System (GPS) whereby they may be capable of determining the geographical location of the user computing device.

Figure 2:
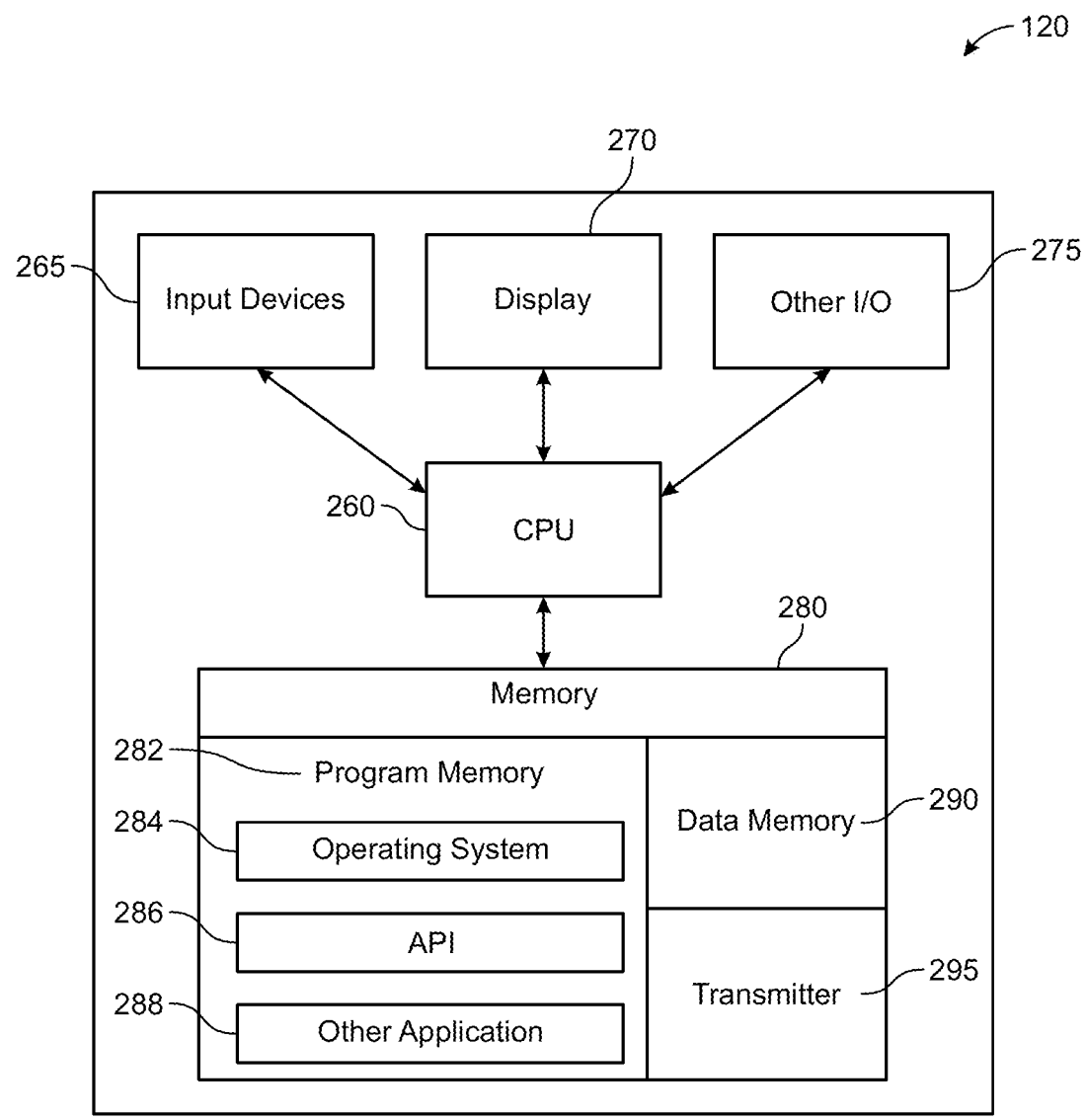
FIG. 2 shows an exemplary block diagram of various components of a computing device.

Turning to FIG. 2, FIG. 2 is a block diagram showing various components of user computing device 120. User computing device 120 may include a housing for containing one or more hardware components that allow access to edit and query communication system 100. User computing device 120 may include one or more input devices such as input devices 265 that provide input to a CPU (processor) such as CPU 260 of actions related to user 102. Input devices 265 may be implemented as a keyboard, a touchscreen, a mouse, via voice activation, wearable input device, a camera a trackball, a microphone, a fingerprint reader, an infrared port, a controller, a remote control, a fax machine, and so on.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 270 may also include a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, and so on.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of user computing device 120.

User computing device 120 may have a transmitter 295, such as transmitter 295, to transmit data. Transmitter 295 may have a wired or wireless connection and may comprise a multi-band cellular transmitter to connect to the server 300 over 2G/3G/4G/5G or other cellular networks. Other embodiments may also utilize Near Field Communication (NFC), Bluetooth, or another method to communicate information.

Users 102 may initially register to become a registered user 102 associated with communication system 100. Communication system 100 may be downloadable and installable on user computing devices 120. In one or more non-limiting embodiments, communication system 100 may be preinstalled on user computing devices 120 by the manufacturer or designer. Further, communication system 100 may be implemented using a web browser via a browser extension or plugin.

Upon initially signing up with communication system 100, user 102 may be prompted to provide an email address and password or other forms of login credentials known by those of ordinary skill in the art. User 102 may then be prompted to provide a two-tier verification method whereby user 102 may request to receive a verification code or token through email or text. A code or token may be generated by server 300 and transmitted to user's 102 email or user computing device 120 by text message whereby user 102 may validate his or her identity by entering the generated code he or she has received into a text block window. In some embodiments, user 102 may receive a mailto link presented in the email sent by server 300. Once selected, user 102 may be directed to a website containing a pre-formatted message whereby the mailto link composes a message that will deliver a unique token to server 300. The unique digital token embedded in the email provides extremely secure authentication, and the utilization of the mailto link may create a very simple experience for user 102.

Once user 102 has validated their identity, user interface 130 may present user 102 with a text window interface whereby user 102 may enter their name, home phone number, cellphone number, email address, physical address, and any other notes as well as a business phone number and business address or any other type of relevant information or contact link for user 102. In some embodiments, user 102 may do this through user computing device 120 whereby the contact information is uploaded to server 300 in standardized format. Users 102 may also enter multiple companies and titles. User 102 may be known as a contact for multiple companies, and as a member of an association whereby user interface 130 may present user an option to associate with said business or an association. Users 102 as a business contact may be linked to a User 102 individual contact, but only if the business administrator authorizes the association and User 102 also authorizes the association. Users 102 as a business position contact may have multiple physical addresses as needed. Letters may be mailed to a listed commercial office address, mail stop, a home office address, or a choice from a list of addresses. Examples of address choices may include other departments such as Accounts Payable Department or company if this service is outsourced. Packages may be mailed to a distribution warehouse by default, or choice from a list of addresses. Examples of address choices may include several jobsites for a construction project manager.

During account creation, account information for user 102 may also be verified from a variety of distinct or different sources, such as from a government entity, a driver license bureau, passport office, third party security service, or by any methods known by those of ordinary skill in the art. For example, this information may be further verified by an employee number, passport number, driving license number, and credit card numbers to name a few examples. Further, various sources may independently verify the data for confirmation in one or more embodiments. Also, verification may be prioritized as some sources of verification may be more reliable than other sources such as being verified by a government organization (e.g., driver license bureau, passport office, etc.), and may be considered more secure than an employer provided identity or an identity from an internet service provider. If verification by server 300 is successful, user 102 may be granted access to communication system 100.

If user 102 is an individual 104, the identity of the individual 104 may be verified. If the user 102 is a business, such as business 106, the business administrator's identity would be verified. The business administrator would then manage, create, and verify identities within that business 106. If the user 102 is a government entity 108, the administrator of the government entity 108 would verify the identity of the government entity 108 as described within this section. The administrator of the government entity 108 can then manage, create, and verify identities within the government entity 108.

After creating an account in communication system 100, user 102 may be assigned a unique identification number made up of one or more numerals and letters or as noted herein may include a sequence of alphanumeric characters or symbols. The numerals may also be other symbols or languages such as but not limited to Cyrillic, Hebrew, Sino, Greek, or Hindi. Typically, the symbols {0, 1, 2, 3, 4, 5, 6, 7, 8, 9} and {A B C D E F G H I J K L M N O P Q R S T U V W X Y Z] may be used. In some embodiments, a binary decimal system may be used, whereby the binary code may range from a four-position binary code 0000 to 1001 (decimal 1 to 9). Alternatively, hexadecimal systems symbols may be used ranging from 0000 to 1111 whereby the symbols {0, 1, 2, 3, 4, 5, 6, 7, 8, 9, A, B, C, D, E F} are used. For example purposes only, John Doe may have assigned unique identifier P32597A2DCC335. Peter Smith may have assigned unique identifier P55871UGG698F6. Kim Daniels may have assigned unique identifier P776EMM6599LD1. Other unique identifiers may be shorter or longer than those shown above and may be also customized or selected by a user to facilitate remembering the unique identifier.

Figure 5:
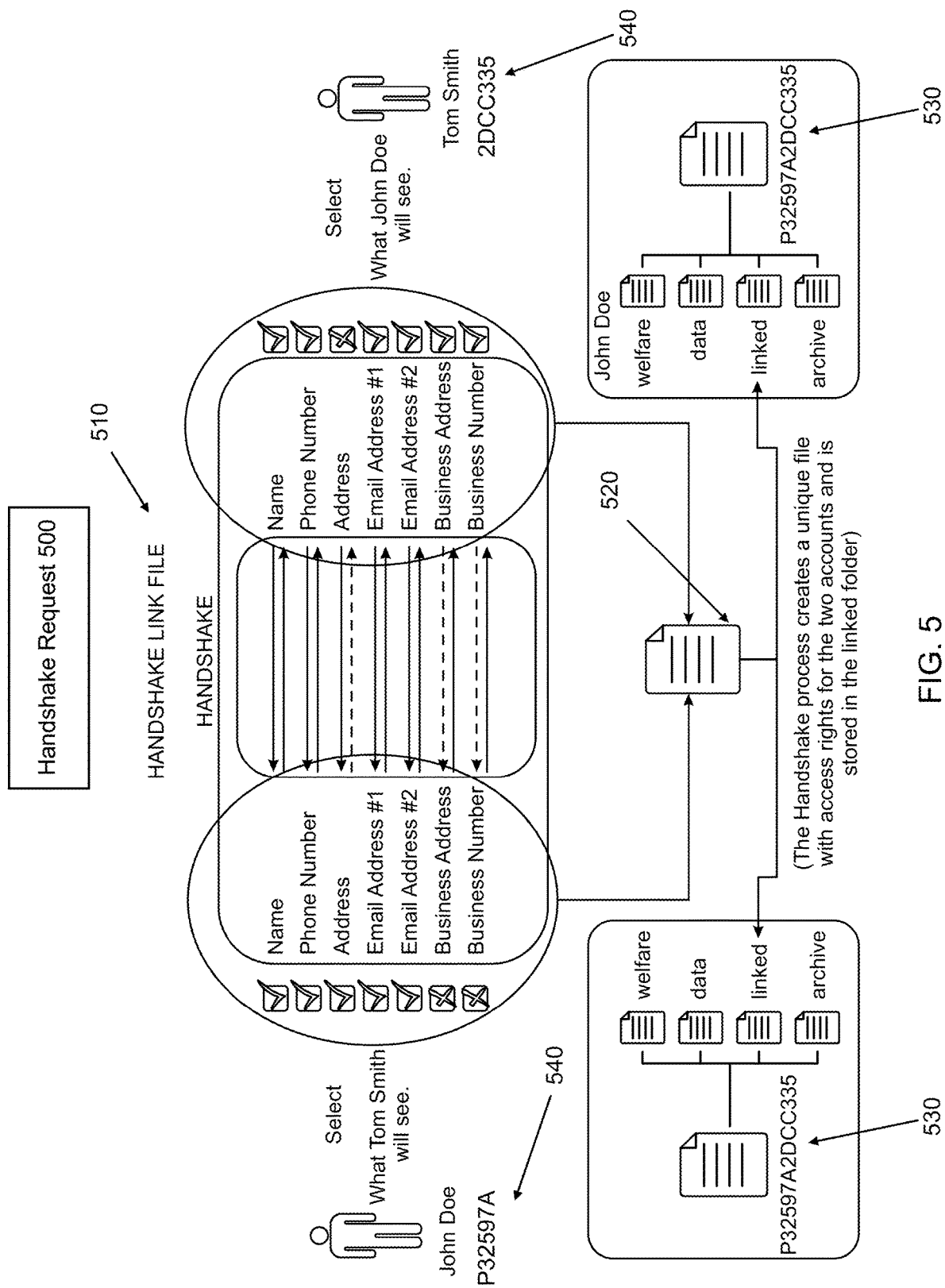
FIG. 5 shows an exemplary handshake file as stored in a linked database.

If user 102 is a Business 106 or Government Entity 108, the administrator of business 106 or government entity 108 may be assigned a unique identification number 540, as illustrated in FIG. 5. All sub-identities may be a combination of the unique identification number 540 of the administrator associated with the business 106 or government entity 108 plus a unique suffix comprised of similar type characters.

User 102 may authenticate a new user computing device 120 whereby user 102 may initiate a session using his or her user computing device 120, which has not been used before to create an account or profile with communication system 100. User computing device 120 may be authenticated by a two-factor authentication process. User 102 may send initial information associated with user computing device 120 such as the model name, user 102's account information, metadata, or a digital certificate, to provide a few non-limiting examples, regarding user computing device 120 to server 300 or to another entity that registers such information. Then, server 300 (or another entity) may send a reply for user 102, which may include, for example, credentials for the user's credentials, tokens, and any other information that user 102 may need to connect and register user computing device 120 with communication system 100. For instance, once user computing device 120 becomes an established user computing device, a verification link or other means of connection may be sent to user 102 in order for user 102 to validate his or her identity. For example, a code may be provided to user 102 and user 102 may provide validation by entering the generated code from user computing device 120.

Figure 3:
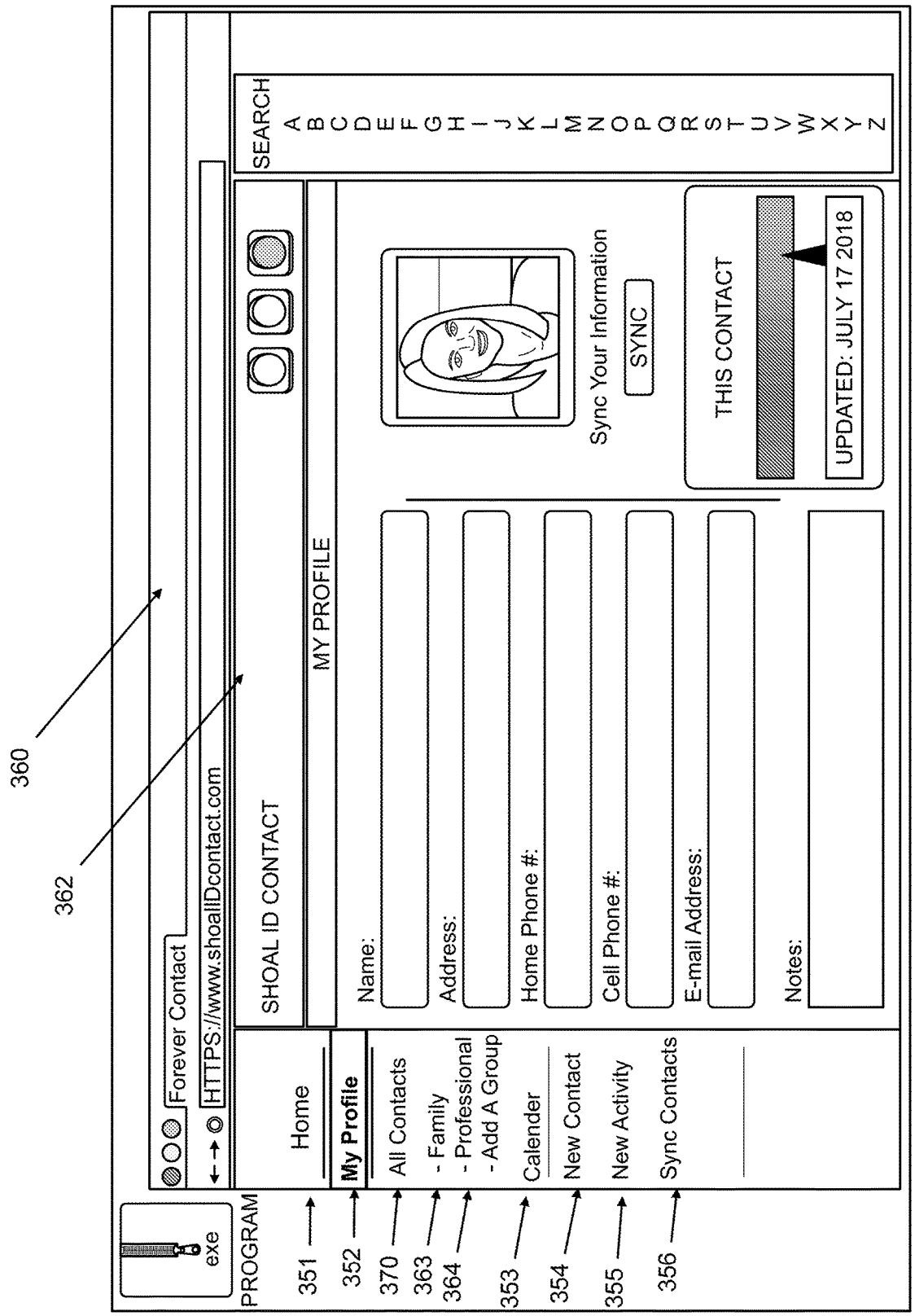
FIG. 3 shows an exemplary user profile tab with a user interface in an exemplary communication system.

Upon successful authentication of user 102, a user profile dashboard 360 may be generated, as shown in FIG. 3. User profile dashboard 360 may be modified, written to, or otherwise administered by the correct respective user 102. System administrator 109 may modify or delete a user profile dashboard or my profile page 362, for example, as a result of inactivity or inappropriate action on the behalf of user 102. A number of different subpages viewable or accessible through user interface 130 by selecting one or more tabs may be displayed to user 102 on user computing device 120. Tabs may include, without limitation, a home tab 351, a my profile section tab 352, family section tab 363, professional information section tab 364, calendar tab 353, new contacts tab 354, new activity tab 355, and sync contacts tab 356 which may be displayed though user interface 130 in a region that displays one or all of the tabs simultaneously or independently. Additionally, the different subpages may include a profile section, a family section, and a professional information section which may be just one of the many different sections that may be chosen by user 102.

Once user 102 has made a connection with another user 102, user interface 130 may present user 102 the option to filter and customize these sections based on their preferences whereby other users 102 may be associated with a specific subset of users 102. For example, one user 102 may have Business/Maryland/Engineers/Mechanical Engineers sections. One user 102 may have Business/Hotels/Marriott/ General Managers sections. One user 102 may have Friends/ Maryland/Football sections. One user 102 may have Friends/College/Penn State sections. One user 102 may have Family/Wife's Family/Cousins sections.

"My profile" page 362, as illustrated in FIG. 3, may present user 102 with a text window interface whereby user 102 may enter, edit, or modify the user's name, home phone number, cellphone number, email address, physical address, and any other notes as well as organizations such as but not limited to a business or association they work for or associate with as well as their business address, business phone number, association number and association address. In one or more non-limiting embodiments, a physical address of user 102 may be automatically provided to user 102 to verify in the "my profile" page 362 that may have been obtained using the global positioning system (GPS) that may be already located on user computing device 120. User 102 may also be presented with the option to select particular photographs to be collected by server 300 whereby server 300 then displays these photographs on the "My profile" tab 352.

User 102 may add contacts to be presented on the home tab 351 and the family tab 363 in numerous ways, as shown in FIG. 2 and FIG. 3. User 102 may authorize communication system 100 to access an address book or other contacts list of users 102. The address book may be stored on user computing device 120, or accessible on a cloud network or through a third-party service provider. In one or more non-limiting embodiments, user 102 may be required to provide credentials to the third-party service provider to allow access by communication system 100. User 102 may also authorize social network access whereby when a social network service is linked to communication system 100, access may be granted to various accounts of user 102 and importing of data from those accounts may occur such as to import one or more social network contacts. Once user 102 authorizes access to one or more contact lists from any source desired, user 102 may individually or as a group select all contacts from a drop-down list or other display. Once a contact is selected, server 300 will send out a request to join communication system 100. If user 102 authorizes access, server 300 collects or otherwise accesses certain address book information and stores the information in data database 320 as shown in FIG. 1. In some embodiments, server 300 may proceed to match contacts with other users who have granted similar access to communication system 100. Matching may occur through the use of phone numbers, email addresses, or social network identification tags, to name a few sources for matching, although other sources may also be used. These are just some of the scenarios for requesting a unique link. Other scenarios may exist such as an invitation by text or by temporarily pairing mobile devices.

In response to a request by user 102, server 300 generates a contact request and notifies prospective user 102 by email, text, phone to phone, airdrop, social media, or other technologies known by those of ordinary request, of the request by first user 102 and displays the request to prospective user 102. For instance, the email displayed to prospective user 102 may include information explaining to the user what communication system 100 is about and why a user has been added or invited as well as information about the respective user 102 who sent out the invite along with selectable buttons that may direct a prospective user to a website having more information pertaining to these topics. The email may also present to prospective user selectable buttons for creating a user account and declaring that they already have an account.

If a prospective contact is not a registered user 102 of community system 100, the prospective contact may be presented with an enrollment session similar to the method already discussed for the initial user 102. Once the prospective contact becomes registered, he or she may be presented with a handshake request 500, as illustrated in FIG. 5. Accepting contact request initiates an action or "handshake" 510 whereby server 300 stores this action on linked database 330 (e.g., FIG. 1) whereby prospective contact and accompanying information pertaining to them will be visible on a user profile dashboard of the requesting contact user.

If the prospective contact declines handshake request 500, request 500 is removed from a user's profile dashboard. The prospective contact receiving request 500 may optionally stop future requests from the initial requesting contact user, whereby server 300 prevents all future requests from requesting contact user 102 to prospective contact user 102.

Server 300 may present actions for classifying prospective contact user 102 privacy settings for the type of information that may be displayed to the requesting contact user 102 such that the type of information shared is selectable by the user. For instance, prospective contact user 102 may only wish to provide requesting contact user 102 with their name, email, phone number, but not their current physical address. Prospective contact user 102 may select through user interface 130 that he or she does not wish to share his or her physical address. This action will be stored in linked database 330, whereby when requesting contact user 102 selects prospective contact user 102, server 300 may only present the information selected and not their physical address. Server 300 may present actions for classifying the type of connection between first user 102 and second user 102, such as but not limited to if they are family members.

Figure 4:
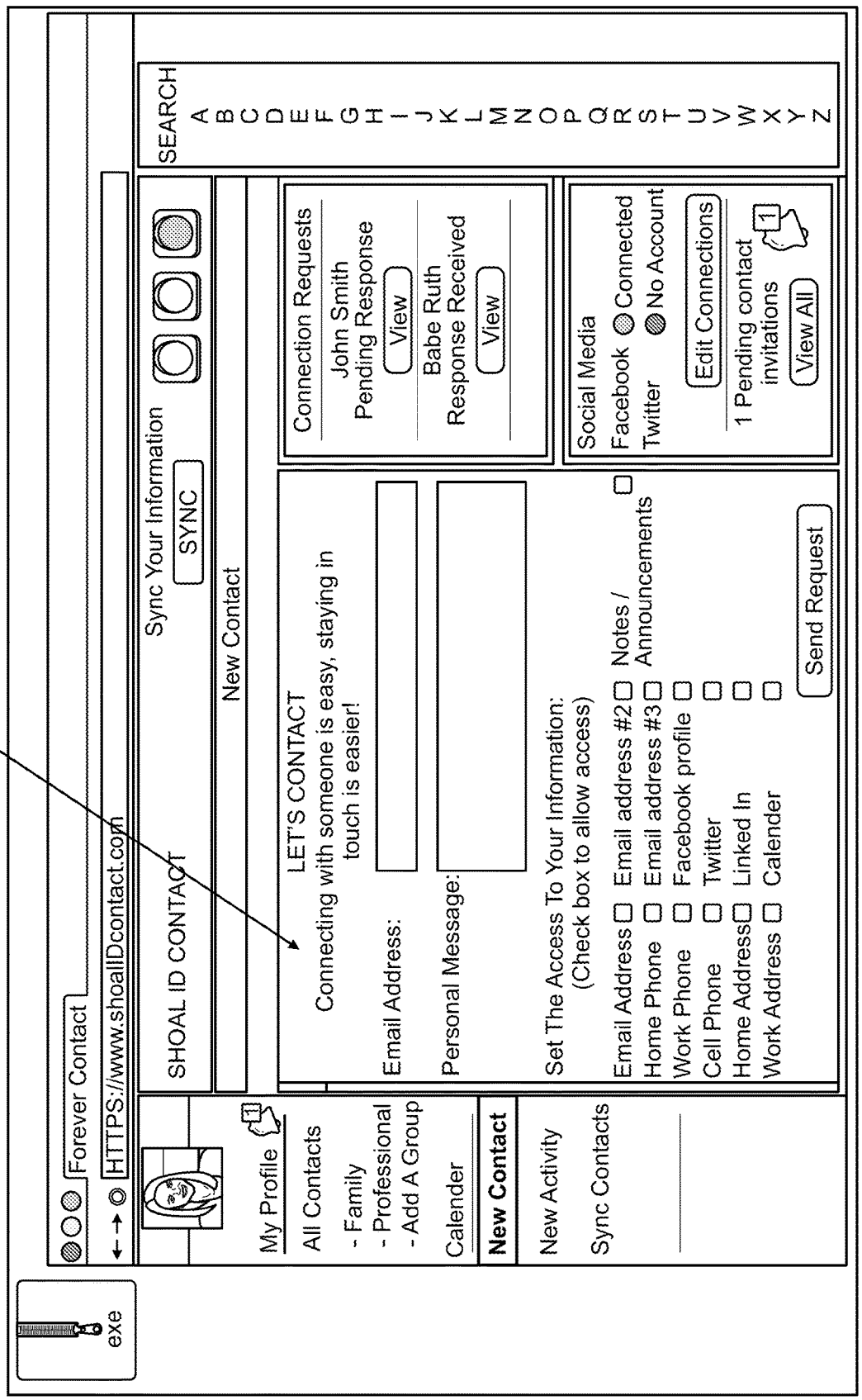
FIG. 4 shows an exemplary new contact tab in an exemplary communication system.

In some embodiments, user profile dashboard 360, as illustrated in FIG. 3, may include a selectable button to add second users 102 as contacts. User interface 130 may display a new contact window 410, as illustrated in FIG. 4 whereby user 102 enters the email address of a second user 102. User interface 130 may display a series of checkable items whereby user 102 may select the details of user 102 to be shared in a "handshake" link 510 for sharing the email address of a second user 102. A search request having a character string may be entered into the search window by user 102 whereby server 300 may receive this request and then display one or more second users 102 identified using their name or other meta data related to user 102. If user 102 wants to add second user 102 to their list of contacts, user 102 selects the option to request to add second user 102.

A search request having a character string may be entered into the search window by user 102 whereby one or more second users 102 may be identified using name, type of services provided, or other meta data related to second user 102. Further, the closest second users 102 matching the search request may be provided on a drop-down list presented to user 102, whereby user 102 may select second user 102 and be displayed their respective profile page. For example, if user 102 wants to locate another user named "Ben," user 102 may type in "Ben" into the search window. A list of names that correspond to the name "Ben" may be provided to user 102 in response to their search.

Once a first user 102 and a second user 102 have connected via a handshake, the handshake creates a unique file 520 in linked database 330 in a standardized format, as illustrated in FIG. 5, corresponding to first user 102 and second user 102, whereby the UID Link 530 may include a combination of unique identifiers 540 of both users 102 as well as any operative tags. In further embodiments, multiple UID links 530 may be generated including a combination of unique identifiers 540 in reverse or second coming in front of the first whereby second user 102 would have this mirrored 530 to first user 102. Operative tags may include the information identifying connection between users 102. Operative tags may include a timestamp taken from the time of creation of the operative tag. Operative tags may include a geographic stamp including a city, state/province, country, time zone, Internet Service Provider, or net speed. Additionally, an operative tag may also include the network type taken from the location of user computing device whereby, in some embodiments, server 300 may compare the geographic information with user's 102 self-entered geographic information for consistency.

An example for a creation of the electronic signature of the handshake stored in linked may be UID1 540+UID2 540+IP Address+GPS+Time Stamp (or similar). The UID link 530 may be masked behind a word, name or symbol, that may be placed in any standard contact database field. When requesting a link, the UID Link 530 will be able to be shared electronically using a user computing device 120 such as a smart phone, tablet or computer. After the link is established, the user uses the UID Link 530 to connect to the cloud server to use the most updated email, phone number, or address available.

Once a UID link 530 and unique file 520 is created between a first and second user 102, the contact information that is shared may be downloaded or automatically transmitted in real time to user computing devices 120 that are registered to first and second user 102 in a suitable format depending on the device (address book, calendar, phone book, contacts). In some embodiments, users 102 may be transmitted a notification on user computing device 120 that a user's 102 information has been updated. This user's 102 contact information may be static on user computing device 120 and may not change until a user 102 checks the contact information and it is automatically updated from server 300, or the complete user's 102 contact information may be automatically updated each time the devices connect to a network depending on user 102 system settings. The contact information on server 300 is dynamic and is constantly updated by first user 102 and second user 102. It should be noted that first user 102 can only modify first user 102 contact data, and that second user 102 can only modify second user 102 data (typical for each user 102). All linked user 102 databases will be updated with the modified data without any action required on the linked user 102.

Every time first and second user 102 address an envelope, use GPS for directions to a physical address, make a phone call, email, or text each other, the user computing device 120 requests the contact information from server 300 and the updated dynamic contact information in linked database 330 is transmitted to user computing device 120 of first and second user 102 and saved as static data on user computing device 120 whereby the data is converted by server 300 from a standardized format to a non-standardized format and transferred for presentation on a user computing device 120. User 102 may be presented the option through user interface 130 to automatically archive the old contact data that was replaced by new data, whereby archived data may be stored in archive database 340. User 102 may have the ability to limit other users 102 from archiving and may select an option not to archive old data.

Communication system 100 may allow the sharing of data (files) between first user 102 and second user 102 once connected whereby the data is stored in the standardized format in databases on server 300 with Communication system 100 provides remote access to users 102 over network 400 so any one of the users can upload the files or documents. Server 300 may then receive this data and convert the data into a standardized format whereby data is stored in linked database 330. A message may then be generated and transmitted to users 102 containing the updated files stored in linked databases 330. This feature allows for sharing specific passwords, banking information, or other secure data. A list of examples may include, without limitation, when an elderly parent shares passwords and banking information with their children or when a rental property owner shares access codes with a renter (Airbnb, VRBO, or similar property rental service), a construction company shares bid document download file access links and passwords, or a parent of a college age child shares medical files or passwords for mobile phones or banking information.

Figure 6:
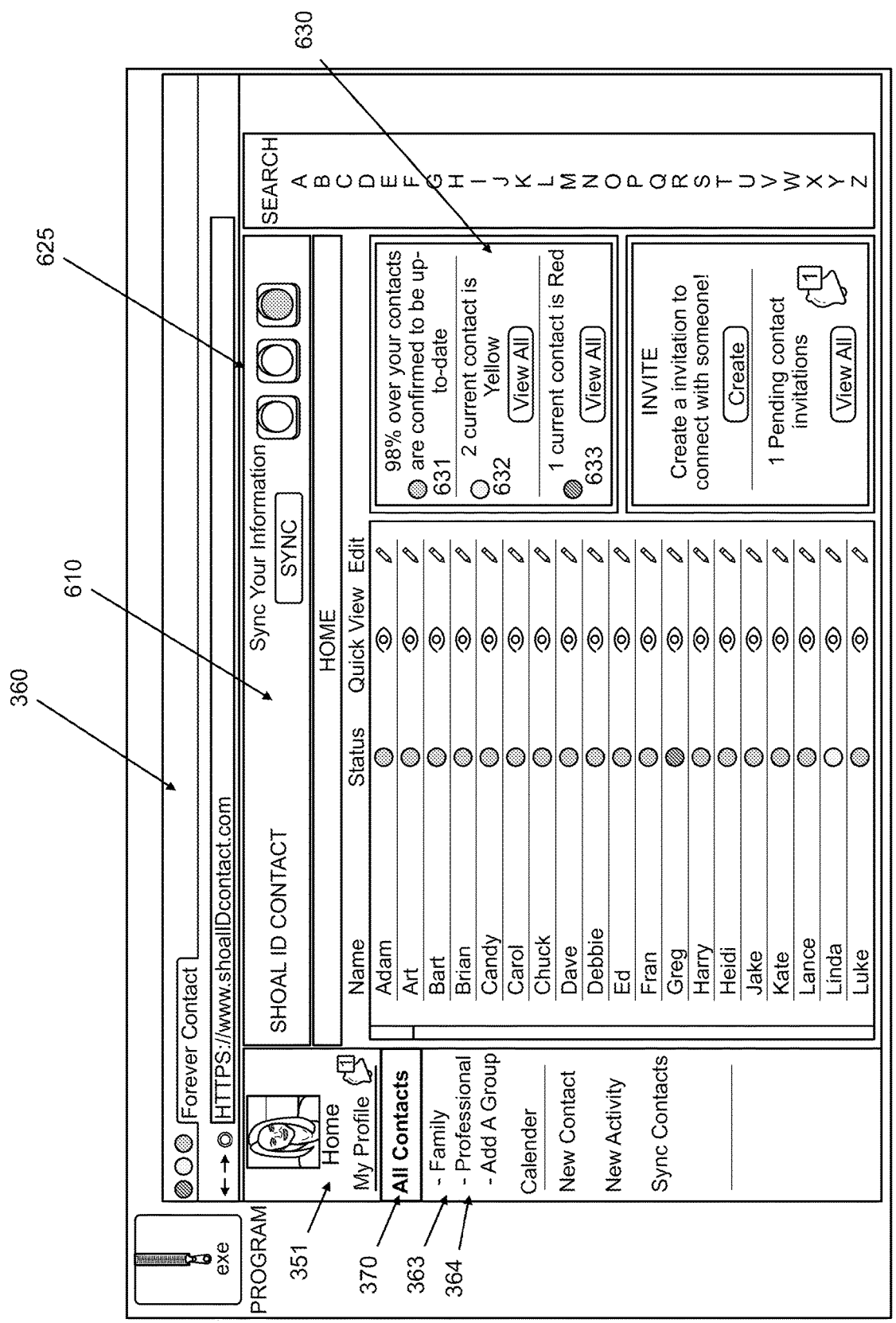
FIG. 6 shows an exemplary all contacts tab in an exemplary communication system.

As shown in more detail in FIG. 6, user profile dashboard 360 may include an all-contacts tab 370 for displaying an all-contacts page 610 of second users 102 who have made a mutual connection through communication system 100 with user 102 along a selectable option to edit the relationship with second user or modify the user data shared. User profile dashboard 360 may include a "family" tab 363 for displaying second users 102 who have made a mutual connection through communication system 100 with user 102 and have been identified as family along a selectable option to edit the relationship with second user or modify the personal data shared. User profile dashboard 360 may include a "professional" tab 364 for displaying second users 102 who have made a mutual connection through communication system 100 with user 102 and have been identified as being in a professional relationship with user 102 along with a selectable option to edit the relationship with second user or modify the personal data shared. Additional group tabs may be added by each user 102.

Figure 7:
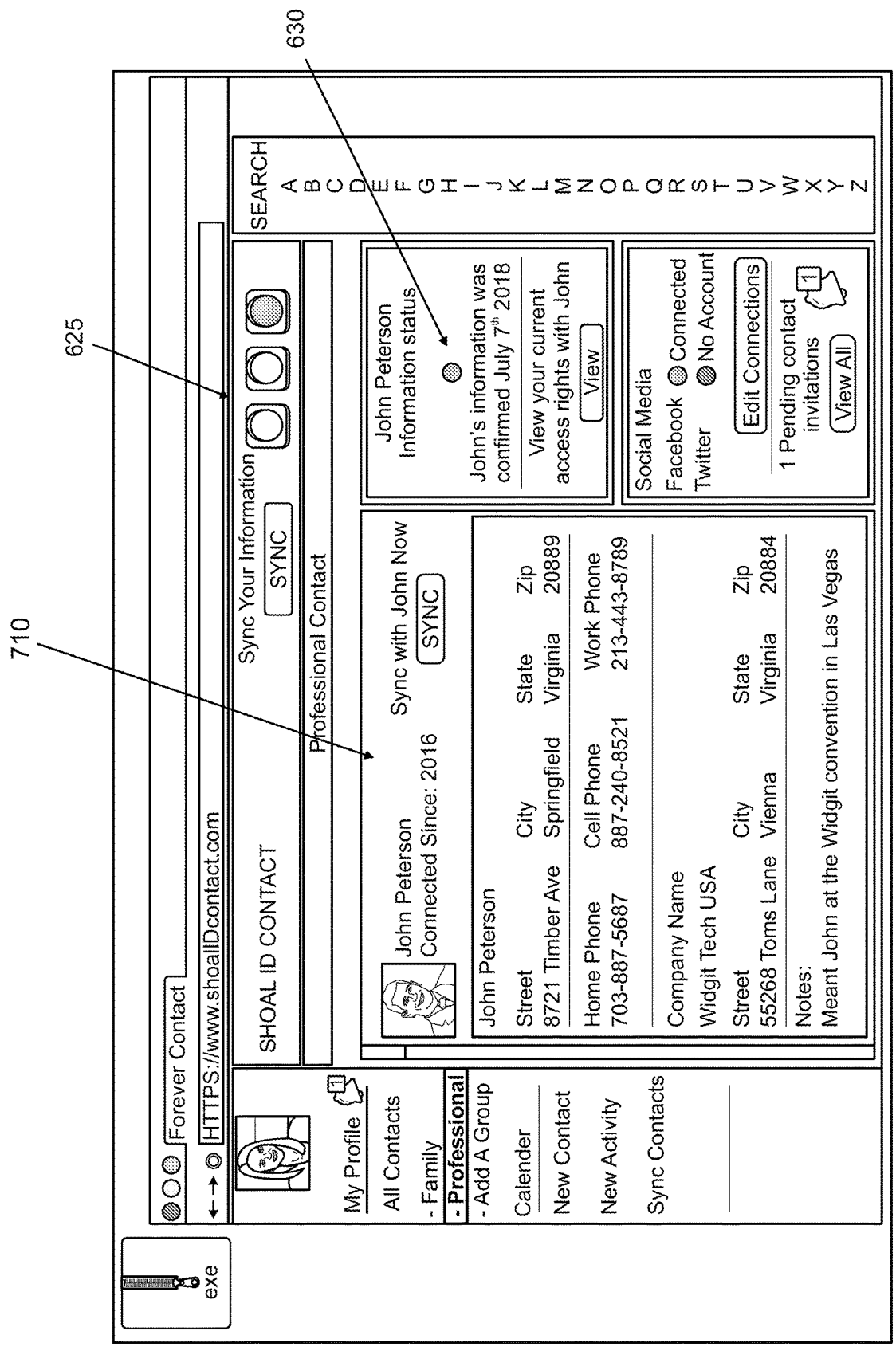
FIG. 7 shows a second user profile page with a user interface in an exemplary communication system.

User 102 may select one or more displayed second users 102 on home tab 351, family tab 363, or professional tab 364, or another group added by user 102. As illustrated in FIG. 7, once the second user 102 is selected, a contact detail page 710 may be displayed with information related to second user 102 such as their name, home phone number, cellphone number, email address, physical address, and any other notes. In one or more non-limiting embodiments, a location of second user 102 that may be obtained using the global positioning system (GPS) programs of user computing device 120 may be also be presented. User interface 130 may provide a selectable button to sync with second user 102 whereby the "handshake" unique file 520 is accessed in linked database and second user 102 personal data is updated to the most recent personal data uploaded by second user 102. Once the link is established, the first user 102 can view the allowed second user 102 data fields and second user 102 can view the allowed first user 102 data fields. Allowed data fields between users 102 may be different. The most current user data in the contact data fields will be displayed and automatically updated.

Communication system 100 may have an account welfare subsystem 110 whereby server 300 monitors account activity as to when a user 102 information has been updated or confirmed to be correct by the user 102 which is also displayed as status indicators to other users 102 when viewing the home tab or family tab or professional tab. Account welfare subsystem 110 is designed to help monitor users and remind them to keep their information up to date so other users 102 may communicate with them. Further, account welfare subsystem 110 may also function to provide an integrated process to determine which accounts are "dead" or basically inactive. In one embodiment, accounts that appear inactive over a period of time may be marked for review by system administrator 109.

Server 300 may automatically calculate the account activity from the time stamp of the last update or confirmation by user 102, whereby the data related to that timestamp and interaction may be stored in welfare database 310. Server 300 may then classify the appropriate action based on the last modification or confirmation and proceed to generate a status indicator to be assigned to a contact user 102. A my status indicator 625 may be displayed to a user 102 themselves. A second user status indicator 630 may be displayed to a user 102 when viewing the specific contact user 102 on their user profile dashboard. In one non-limiting embodiment, the status indicator may be displayed in the form of a color code system such as green, yellow, and red.

In operation, when viewing the home profile subpage in the user profile dashboard, user 102 may be presented with information pertaining to the account activity or status of one or more second users 102 who have a mutual connection or completed the "handshake process" as illustrated in FIG. 6. The status may be displayed by second user indicators 630 that may be categorized by color. For example, as shown in FIG. 6, the colors red 633, yellow 632, and green 631 may be used for second user indicators 630. As shown in FIG. 6, in one non-limiting embodiment, account information that has not been updated by its contact user 102 in over 6 months may be displayed as RED 633 to user 102. Account information that has not been updated by its user 102 in 3 months is displayed as YELLOW 632 to user 102. Account information that has been confirmed by its user 102 within the last 3 months is displayed as GREEN 631 to user 102. In this scenario, the system registers that the account information has not been synced by the owner in over 3 months and may use the color yellow as an indicator of such. Any accounts that have links to this account would then show this account status as yellow. In some embodiments, these indicators (Red, Yellow, Green) may be displayed with the contact information transmitted to the computing devices. For instance, if first user 102 was to look at second user 102 contact info on their contacts application they would see the contact information of second user 102 and a corresponding indicator based on the last time they checked or updated their contact information. In this example, the contact information may be updated from a green indicator (emoji color) to a yellow indicator (emoji color) when second user 102 has not updated their contact information in 3 months. This allows first user 102 to better assess if this is the proper contact information of second user 102 which is especially useful when sending an urgent or otherwise important information that needs a quick response.

In response to a certain status or passing a predetermined threshold of time that user 102 has not modified or confirmed his or her account information, server 300 generates a notification and notifies user 102 by email, text, or social media that his or her account information has not been updated within the defined time limits of communication system 100. For example, a notification may be sent to user 102 requesting user 102 to login and confirm his or her profile information. In some embodiments, server 300 may generate a notification request based on prolonged absence of one specific type of account information, such as physical address or phone number. This notification and request for information after a minimal period of time may ensure that user 102 keeps his or her contact information up to date, so that the other linked users may always have user 102's up to date and current contact information.

In one or more embodiments, communication system 100 may use one or more algorithms to predict when users 102 need to update their status based on individual alterations by user 102 or a group of users 102. For instance, if user 102 has changed their address every twelve months or their job every three years, system 100 may predict based on previous data that user 102 may need to update their contact info and transmit a notification to them. Another example would be if on average an overall group of users 102 on the system or in a specific region have changed their address or phone number after two years, system 100 may predict based on previous data that user 102 may need to update their contact info and transmit a notification to them.

For example, if the accounts of two users 102 have not been updated within the defined time limits, server 300 may identify and flag the accounts, whereby server 300 generates a notification by email to nudge users 102 to modify or confirm their account information.

The system may generate a message to user 102 who needs to login to his or her profile to read the message(s) that other users 102 are unable to contact them. In one non-limiting example, first user 102 may terminate his or her employment with ABC Company and consequently removes the business contact data from his or her profile. In some embodiments, if first user 102 terminates their employment, this may automatically delete contact information on remote computing devices for business only links or replace information with a message signifying termination. In the case where user 102 has deleted all business contact data, their display my status indicator 625 to all business only links immediately turns to RED until new business contact data is entered for all connected devices having a UID Link 530. Second user 102 is a business only contact whereby first user's 102 business contact information may not be visible until the business contact fields are entered by first user 102. Second user 102 can send a request to the system, which generates a message to first user 102 stating that second user 102 is attempting to contact them.

In other embodiments, a second user 102 may request the first user 102 to modify or confirm their account information because the information has not been updated within the defined time limits. Second user 102 may want to use this option if first user's 102 indicator is RED, or if second user 102 is having trouble contacting first user 102 using their current contact information. In one embodiment, server 300 may generate a notification and notify first user 102 by email, text, or social media that his or her account information has not been updated within the defined time limits of communication system 100 whereby the notification may request user 102 to login and confirm his or her information and that the request to do so was sent from second user 102. In another example, first user 102 may have updated his or her contact information but enters the wrong contact data. In such a case, second user 102 may also choose to send a manual notification to request first user 102 to confirm their information.

For example, a purchasing agent may have business contact UID 540. The purchasing agent may have a separate personal UID 540 stored on data database 320. The business contact UID 540 remains with the business. The purchasing agent may have the ability to include their business UID 540 in their email signature line when transmitting emails. Purchasing Agent may have the option to share their personal UID 540 with a second business contact that is linked through communication system 100. The business administrator may have the option to turn off the option to share employee personal UID 540 such as purchasing agent through the business link. Businesses may create a separate website for corporate business to business positions.

Users 102 as an individual may be able to prevent SPAM email, text or phone calls (phishing) through users 102 connected as business contacts. This may or may not require user 102 to take an action to confirm their identity through communication system 100 which is connected to the email, text or phone. In some embodiments, email, text, or phone systems connected to communication system 100 may be configured to automatically direct the unverified emails to the emails to a specified folder of their choice such as an Unverified Folder, or a Junk Folder.

Users 102 as a business position contact may not require verification of user 102 through communication system 100 as no personal information would be entered or otherwise shared. The business name and/or department and/or position may be displayed when receiving a phone call, text, or email by default. An example may be "ABC Corp/Estimator #1." Users 102 may or may not temporarily change this to an individual's name while they work for this business or agency.

Users 102 as a business position contact may be able to prevent SPAM email, text, or phone calls (phishing) due to the verified B2B link. This may or may not require the receiving party to take an action to confirm the identity of user 102 through communication system 100. Email systems may be configured to automatically direct the unverified emails to the Junk folder.

Figure 8:
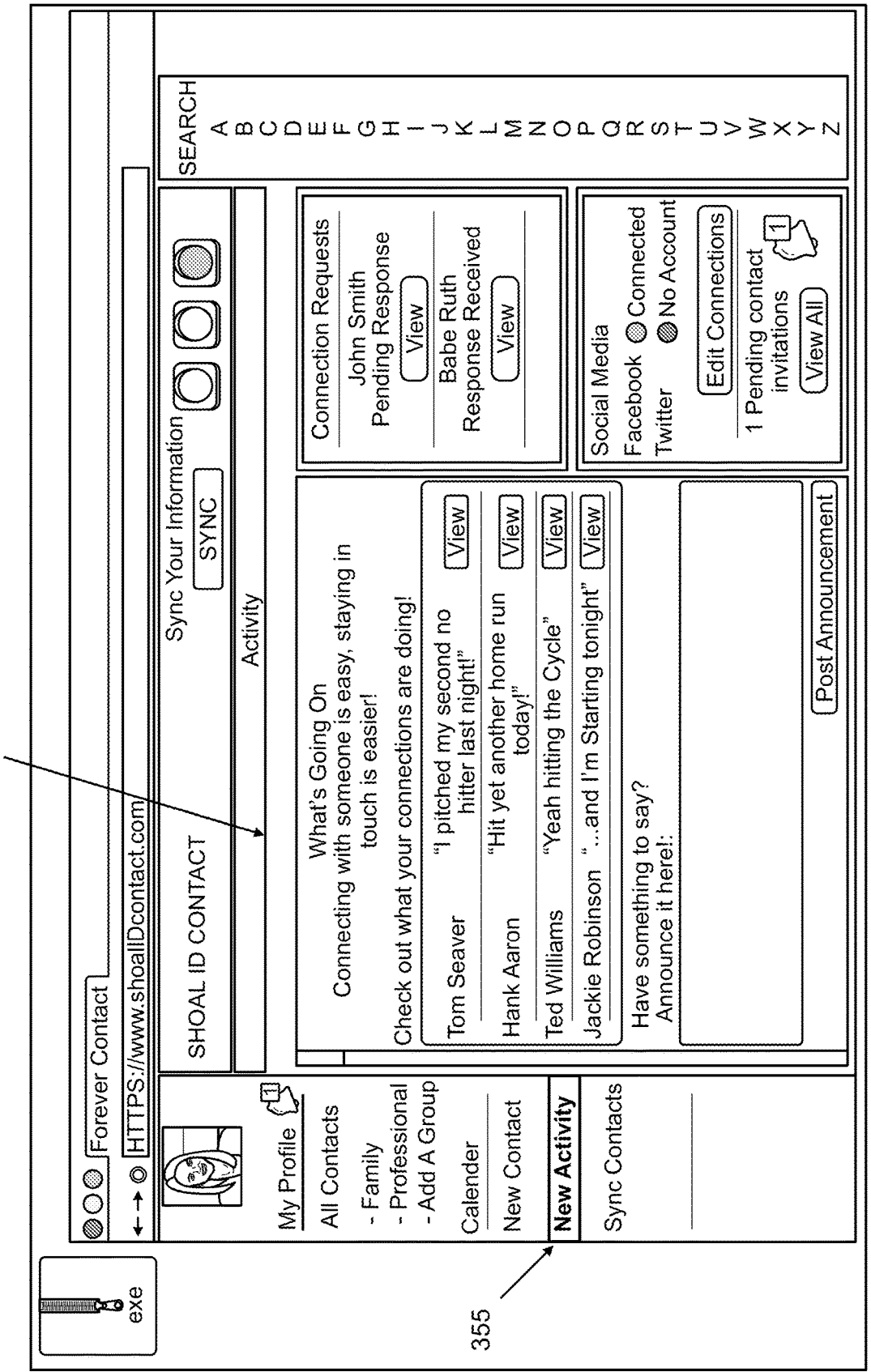
FIG. 8 shows a new activity tab with a user interface in an exemplary communication system

As illustrated in FIG. 8, the user profile dashboard may include a new activity tab 355 that when selected presents a new activity page 810, whereby server 300 may retrieve notifications associated with selected user 102 contacts with a connection to user 102 and apply this data to provide an activity section to access posts created by user 102 or any other users of communication system 100. Posts that appear on the activity section may be displayed in chronological order with the newest posts positioned at the top of the feed section while older posts may be displayed by scrolling down on the feed section or by viewing subpages associated with the feed section.

User interface 130 may present user 102 with the ability to create additional posts whereby user 102 may express themselves or announce information related to themselves. User 102 may also upload photos or videos as a post or to accompany a post whereby photographs uploaded by user 102 are collected by server 300, such that server 300 is able to store photographs on a database. The photos or videos may then be displayed on user interface 130. Further, user interface 130 may present user 102 with filtering criteria to select which users may view the newly created post. In one or more non-limiting embodiments, depending on the user's privacy settings which may be set or modified through user interface 130 by user 102 via the user profile dashboard, any action that a user 102 enters may be viewable to other users 102, such as but not limited to likes, follows, and reviews.

The notifications tab of user profile dashboard may include a drop-down list related to events whereby server 300 may retrieve notifications associated with user 102 and other users 102 whereby server 300 may apply this data to provide notifications pertaining to user 102 as well as the actions of other second users 102 whereby a status indicator may appear directly on or proximate to the notification tab to notify user 102 when one or more notifications have occurred.

Figure 9:
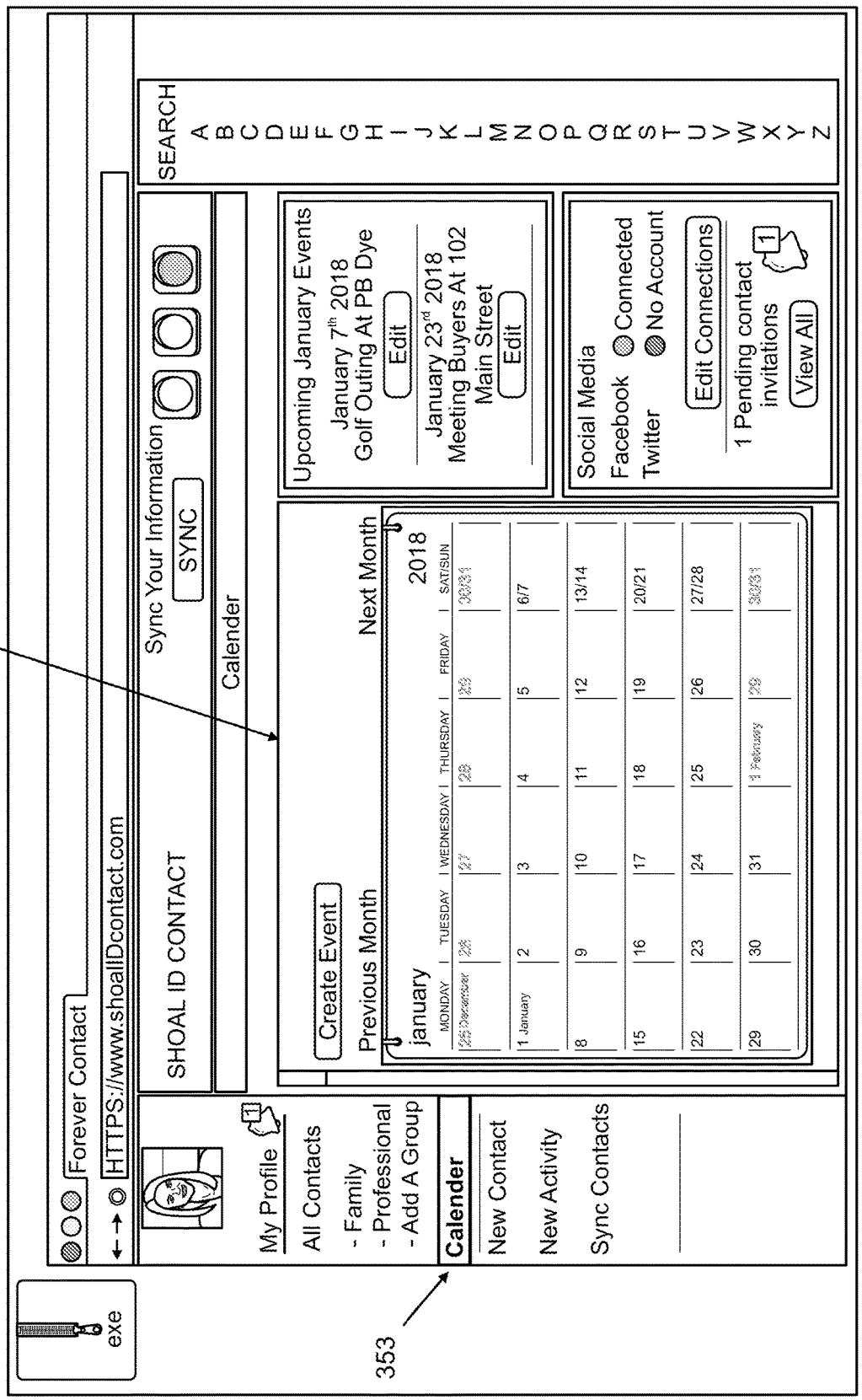
FIG. 9 shows a calendar tab with a user interface in an exemplary communication system.

User profile dashboard may include a calendar tab 353 that when selected presents a calendar subpage 910, as illustrated in FIG. 9. In calendar subpage 910 of the user's profile dashboard, appointments for user 102 over a set period of time (e.g., such as a month or week) may be displayed. In response to a request to view user's 102 calendar, server 300 may retrieve any appointments from data database 320 associated with user 102, whereby server 300 may apply this data to a calendar template to provide a viewable calendar for user 102 with appointments or events. The name of user 102 or other details may be indicated on the calendar interface. In some non-limiting embodiments, the calendar would be treated as any other shared field whereby user 102 may be able to select whether or not to share their personal calendar when configuring each unique link with a second user 102.

If user 102 has multiple calendars such as for multiple businesses 106, that user 102 owns or multiple profiles associated with user 102, user 102 may be presented with the option to specify which calendar should be viewable while all appointments from multiple and profiles may be displayed on one calendar with different indicators such as color, shapes, font, or change in appearance to distinguish themselves from one another. In one or more non-limiting embodiments, user 102 may select among multiple templates, designs, or formats in which appointment booking data may be presented. User interface 130 may provide user with options to share a calendar with a contact as well as establishing a group whereby users 102 in the group may view one another's calendar (e.g., a family member or business colleague).

While not shown in the Figures, in one non-limiting embodiment, a user profile dashboard may include a chat subpage for displaying a chat messaging interface to user 102. In one or more non-limiting embodiments, the chat messaging interface displayed to user 102 allows user 102 to establish a chat session with a second user 102. After selecting a chat tab, user 102 may also be presented with a list of current chats with other users 102.

In some non-limiting embodiments, users 102 of communication system 100 may request for services from one or more vendors whereby users 102 may select to receive assistance from one or more services. Registered vendors may have an option to generate an automated marketing campaign to interested users 102. In one non-limiting embodiment, the registered vendors do not receive user 102 information from communication system 100. Rather, the registered vendors only receive user 102 information directly from user 102 if they choose to contact the Registered Business after seeing their marketing campaign.

User interface 130 may present to user 102 a checklist, drop down menu, or other display such as home repair, window replacement, and handyman services for various services they wish to acquire whereby. Once these services are selected, server 300 then adds the unique identifier (UID) of user 102 to the "opt in list" for the service requested. A connection is then established for all the servers within the select service category selected by user 102. Server 300 may then transmit premade emails from vendors for the services about which user 102 has opted into or indicated that he or she wants to receive marketing and advertising. Emails may have advertisements in the form of offers such as discounts or other incentives.

Once user 102 has secured a vendor for the service, user 102 may select that he or she wishes to opt out of the category whereby server 300 may no longer provide marketing emails, which may also prevent unwanted additions to mailing lists, including email lists.

In some embodiments, user 102 may only receive marketing materials of vendors that are within a predetermined distance of user 102's physical address or the location of user computing device 120. In other embodiments, advertisements may also be transmitted to user computing device 120 for presentation on user interface 130 to user 102.

Users 102 as an individual may be able to use their UID as confirmation for an electronic signature. This electronic signature verification may be used in retail, contract, banking or wherever identity verification is required. Electronic signature verification may be used as a substitute for credit card "swipe" transactions, as the non-swipe transactions are often reversed when fraud is suspected. Electronic signature verification may include generating a packet configured for transmission to at least one institution (bank, credit union, authorities, government body, or other entity), the packet including the UID whereby the packet further comprises one or more tags, whereby the tags have a timestamp of the time of validation of the biological sample corresponding to the user as well as other tags such as but not limited to IP addresses or GPS.

When user 102 uses UID to access privileges, packets may be sent to an Institution or third-party service whereby the institution responds to receipt of user 102's packet by acknowledge receipt of user's 102 account association with packet by transmitting the confirmation to user 102 through user interface 130, or other methods such as through an application, email, or text. Institution may then determine if the account of user 102 is valid and on active status and then confirm the account of user 102 whereby user 102 may then be granted any privileges that are granted by a successful verification of UID such as authentication or further instructions.

In one or more non-limiting embodiments, user 102 may be inputting a UID to authorize payment to purchase goods from a merchant through communication system 100. A merchant is any entity that sells goods or services and maintains a merchant account that enables them to accept payment collected through the authentication of Unique IDs as payment from user for goods or services provided. Once account has been verified, the appropriate rules are checked and applied and the availability of funds is determined from the account of user 102. If there are insufficient funds, a rejection may occur whereby the rejection transaction is logged with data database 320 whereby user 102 may be presented with the rejection notice through user interface 130.

UID for user 102 may be used as an authentication method during a two-factor authentication process. For instance, once user 102 has an established user ID, a verification link or other means of connection may be sent to user 102 in order for user 102 to validate his or her identity. For example, a code may be provided to user 102 and user 102 may provide validation by entering the unique ID.

In some embodiments, identification may further be validated by fingerprint sensor identification from a fingerprint sensor. The fingerprint sensor may have optical, capacitive, light emitting sensors, or multispectral approaches. The fingerprint sensor may be fabricated upon a flexible substrate to allow for better optical coupling with the finger of user 102. In one or more non-limiting embodiments, the fingerprint sensor may be connected to user computing device 120. Capacitive sensors may be used to analyze the full range of the finger or a swipe of the finger such that when the finger ridges make contact the capacitive sensor detects electrical currents with the finger ridges. Optical sensors may be used whereby a prism, light source, and light sensor are used to capture images of fingerprints. In other non-limiting embodiments, other biometrical data may be used to validate the identity of user such as vein patterns, heart rate, heart rate variability, blood flow, blood pressure, and any other biometrics.

If authorized pursuant to their agreement previously agreed upon by user 102 and institution, institution may then charge the electronic payments against user's 102 account, such as, without limitation thereto, user's 102 checking account, savings account, credit card, or debit card. Similarly, institution may credit a merchant's checking account, savings account, or credit account for electronic payment.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A communication system, comprising:
   a computing system having a non-transitory computer-readable medium comprising code, wherein instructions are executed by the computing system to perform:
   associating a first user with a first unique identifier;
   associating a second user with a second unique identifier;
   generating a first communication link and second communication link, wherein the first communication link and the second communication link are stable links stored in one or more databases; and
   associating the first user with a business identifier linked to a business entity of the first user, wherein the business identifier comprises a sequence of alphanumeric characters unique to the business entity, and wherein the business identifier is permanently linked with the business entity and removably linked with the first user.

2. A communication system, comprising:
   a computing system having a non-transitory computer-readable medium comprising code, wherein instructions are executed by the computing system to perform:
   displaying a first status indicator to an other user;
   calculating if account activity of a user has dropped below a predetermined threshold determined from a time stamp, wherein if the account activity has dropped below the predetermined threshold, the first status indicator is updated to a second status indicator, the second status indicator displayed to to the other user, the second status indicator indicating to the an other user a time period that the account activity has dropped below the predetermined threshold.

3. The communication system of claim 2, wherein further instructions are executed by the computing system to perform:
   associating the user with a first unique identifier;
   associating the an other user with a second unique identifier; and
   generating a communication link, wherein contact information of the user and the an other user are stored on one or more databases wherein the first status indicator or the second status indicator are displayed when viewing a user page of the user.

4. The communication system of claim 3, wherein further instructions are executed by the computing system to perform: utilizing one or more algorithms to predict when the user will need to update the contact information based on past behavior of the user and second users in a same geographical region.

5. The communication system of claim 2 wherein the first status indicator and the second status indicator are displayed to the an other user when they are linked to the user by a permanent communication link.

6. The communication system of claim 5, wherein the communication link comprises the first status indicator, the second status indicator, and a number of operative tags.

7. A communication system, comprising:
- a computing system having a non-transitory computer-readable medium comprising code, wherein instructions are executed by the computing system to perform:
- associating a first user with a first unique identifier;
- associating a second user with a second unique identifier; and
- generating a communication link, wherein the communication link is a stable link and stored in one or more database, wherein the communication link comprises a sequence of alphanumeric characters unique to an association between the first user and the second user, wherein the communication link is active until removed by the first user and the second user, the communication link visible to the first user and shareable between multiple computing devices.

8. The communication system of claim 7, wherein the communication link enables encrypted communication across multiple devices between the first user and the second user only accessible by the first user and the second user.

9. The communication system of claim 8, wherein the encrypted communication is restricted to forms of communication that are chosen by the first user and the second user.

* * * * *